United States Patent [19]

Cook et al.

[11] 4,263,553

[45] Apr. 21, 1981

[54] DISCRIMINATING METAL DETECTOR WITH COMPENSATION FOR GROUND MINERALS

[76] Inventors: Kenneth M. Cook, 456 E. Lincoln Ave., Palatine, Ill. 60067; Alan W. Hametta, 404 E. Marshall, Arlington Heights, Ill. 60004

[21] Appl. No.: 910,203

[22] Filed: May 30, 1978

[51] Int. Cl.³ .............................................. G01V 3/08
[52] U.S. Cl. ................................................... 324/327
[58] Field of Search ....................... 324/3, 5, 236, 327

[56] References Cited

U.S. PATENT DOCUMENTS

| 2,438,197 | 3/1948 | Wheeler | 324/3 X |
|---|---|---|---|
| 2,447,316 | 8/1948 | Curtis | 324/3 X |
| 2,909,725 | 10/1959 | Bell | 324/236 |
| 3,201,774 | 8/1965 | Uemura | 324/3 X |
| 3,202,909 | 8/1965 | Stewart | 324/3 |
| 3,601,691 | 8/1971 | Gardiner | 324/3 |
| 3,823,365 | 7/1974 | Anderson | 324/236 |
| 3,896,371 | 7/1975 | Hametta | 324/3 |
| 3,961,238 | 6/1976 | Randolph | 324/3 |
| 4,024,468 | 5/1977 | Hirschi | 324/3 |

*Primary Examiner*—Gerard R. Strecker
*Attorney, Agent, or Firm*—Michael J. Femal

[57] ABSTRACT

A discriminating metal detector that can compensate for ground minerals includes an oscillator circuit having at least two attenuation coils physically located in a probe of the metal detector for ground control. The probe also includes a resonant LC circuit having an inductive coil on the same plane as the attenuation coils but on a different axis than the attenuation coils. The attenuation coils of the oscillator circuit have no magnetic effect on the inductive coil or on the natural response of the inductive coil to metal objects. The attenuation coils of the oscillator operate at a substantially higher frequency than the inductive coil of the resonant LC circuit. As the resonant frequency of the discriminating LC circuit varies due to mineral changes in the ground the oscillator frequency shifts likewise proportionally in order to maintain a constant separation between the two frequencies. This desirable effect is provided by incorporating the oscillator coils inside the probe with the inductive coil thereby assuring that both the inductive and attenuation coils are exposed to the ground minerals and effected at the same rate. The discriminating metal detector is capable of detecting gold, silver, coins, rings, and other valuables while rejecting trash like iron, pull-tabs, foil, bottle caps in addition to cancelling the effect of ground minerals in high mineral areas.

10 Claims, 7 Drawing Figures

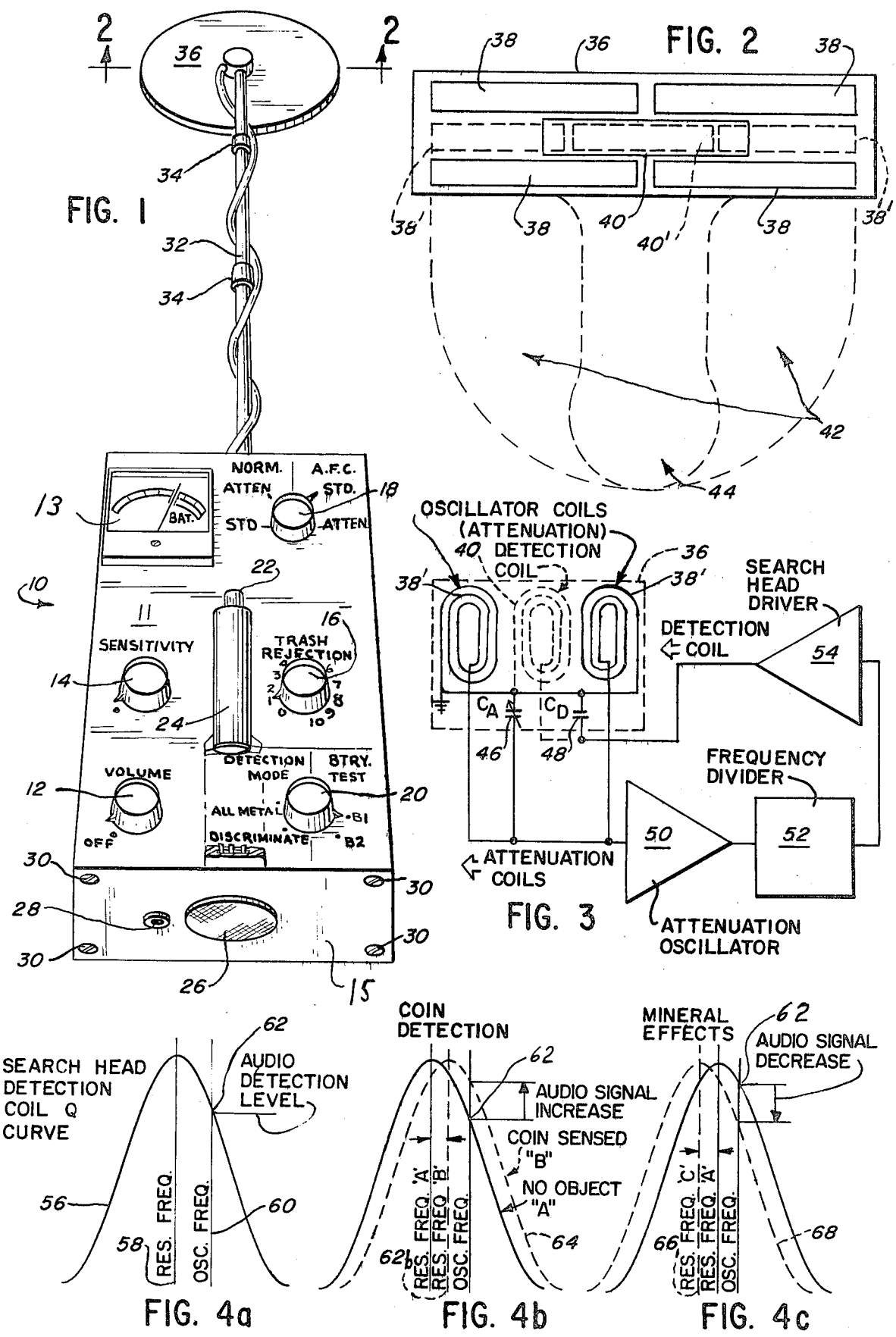

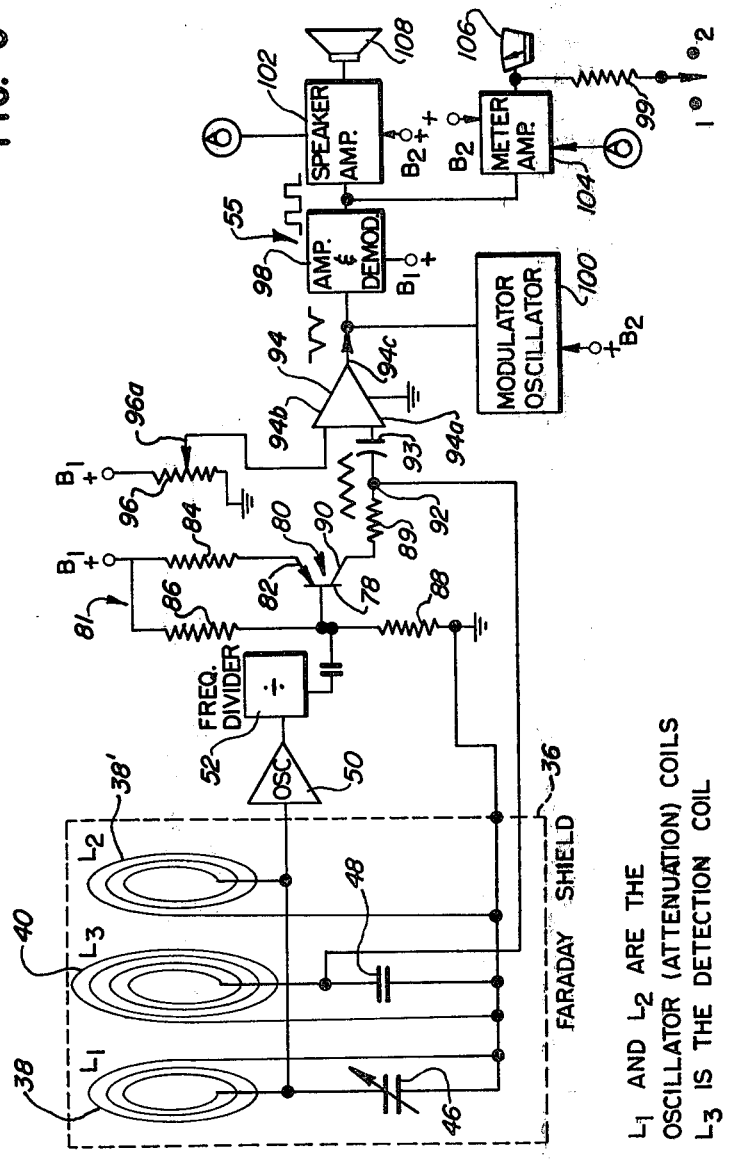

DISCRIMINATING METAL DETECTOR WITH COMPENSATION FOR GROUND MINERALS

BACKGROUND OF THE INVENTION

This invention relates to metal detectors, and more particularly, to a discriminating metal detector that compensates for ground minerals while at the same time rejecting trash and detecting valuable objects in the high mineral ground.

The first metal detectors used by amateur and professional treasure hunters were of the type that detected all metals alike. This meant that treasures such as coins, rings, jewelry, and other valuables would give an increase in the audio signal as would trash such as nails, tin foil, pull-tabs and other junk. Next came the discriminating metal detectors that could separate the treasure from the trash. The treasure or desirable metals would give an increase in audio tone, while the trash would give a decrease or no change in sound level. However, the discriminating detector while a great improvement over the all metal detector in high trash search areas still encountered difficulties when the ground contained a high degree of mineralization in the search area. This resulted in the latter detector circuitry to emit changes in the audio tone due to soil minerals, or in other words false signals.

An unique discriminating metal detector of the latter type is disclosed in U.S. Pat. No. 3,896,371 which can separate the treasure from the trash where the ground has a low mineral content. However, the natural resonance of the LC circuit in its search head is shifted when the ground minerals are high in the search area. This shift in frequency causes the detector to emit false signals. Ground minerals are defined as soil containing a powdered, compressed, and sintered magnetic material having high resistivity, consisting chiefly of ferric oxide combined with one or more metals.

OTHER PRIOR ART

U.S. Pat. No. 4,024,468—Hirschi, U.S. Pat. No. 3,601,691—Gardiner, and U.S. Pat. No. 3,201,774—Uemura.

SUMMARY OF THE INVENTION

The foregoing problems of false signals in discriminating metal detectors due to high ground minerals is substantially solved by the present invention. As the resonant frequency of the LC circuit varies due to mineral changes in the ground, the oscillator frequency also must shift proportionally in order to maintain a constant separation between the natural resonant frequency of the LC circuit and the frequency of the oscillator circuit. This is achieved by incorporating the oscillator coils inside the search head with the inductive coil, therefore, both coils are exposed to the same ground minerals and are effected at the same rate.

An object of the present invention is to provide a discriminating metal detector which compensates for the high ground mineral effects on the detection system while detecting and discriminating between the various metal objects that are contained within the ground under the search head.

Another object is to provide a discriminating metal detector which compensates for high ground mineral effects in which an oscillator circuit having two coils of opposing fields operating at a high enough frequency as to have a rise in frequency for ferrous and non-ferrous objects and still lower frequency when the ground minerals are detected and in which the frequency of the two coils is lowered in order to drive the detection coil at the proper detection frequency for optimum discrimination and in which the detection coil is placed in the magnetic null between the two oscillator coils to minimize the falsing and the transmission receive effects.

In accordance with the present invention, a discriminating metal detector which compensates for high ground minerals includes an oscillator circuit having two coils of opposing magnetic fields operating at a high enough frequency as to have a rise in frequency for ferrous and non-ferrous objects and still lower in frequency when ground minerals are detected. The frequency of the oscillator coils is then lowered to drive the detection coil in the search head at the proper frequency for discrimination between trash and valuable objects. The oscillator coils are placed in the probe on the same plane as the inductive coil but on a different axes so that the inductive coil can be placed in the magnetic null between the two oscillator coils to minimize the falsing and the transmission and receive effects. This construction permits the oscillator frequency to shift proportionally along with the resonant frequency of the inductive coil in the search head due to ground mineral changes for maintaining a constant separation between the oscillator frequency and the inductive coil frequency.

BRIEF DESCRIPTION OF THE DRAWINGS

The features of the present invention which are believed to be novel and unobvious are set forth with particularity in the appended claims. The invention itself, however, together with other objects and advantages thereof, may best be understood by reference to the following description taken in conjunction with the accompany drawings in which:

FIG. 1 is a perspective view of a novel detector;

FIG. 2 is an exploded and diagramatic side elevation view of the detector taken along line 2—2 of FIG. 1;

FIG. 3 is a combination schematic and block wiring diagram of a preferred ground mineral compensating circuit for use in the metal detector of FIG. 1;

FIG. 4a–4c show the detection Q curve and frequency levels which serve to explain the effect of coin and minerals on the metal detector of FIG. 1; and FIG. 5 shows the novel detector circuitry of the present invention incorporated into the metal detector of U.S. Pat. No. 3,896,371.

DESCRIPTION OF THE PREFERRED EMBODIMENT

Referring now to FIG. 1, a metal detector 10 which can discriminate between treasure and junk metal objects in a high mineral soil includes novel circuitry which compensates for high ground minerals. Essentially, the metal detector 10 of my invention incorporates many of the same operating circuitry and control features of the metal detector shown in U.S. Pat. No. 3,896,371 and reference is hereby made to that patent for operating circuitry which is in common and also to demonstrate the type of metal detector which can be modified to include our novel circuitry.

A top face 11 of the metal detector housing 15 serves as a control panel. The control panel 11 includes a volume on-off switch 12, a sensitivity meter 13, a sensitivity switch 14, and a trash rejection switch 16 which all operate identical to the corresponding controls on the metal detector of the above-mentioned patent. In addition, the control panel further includes control switches 18, 20, and 22 mounted on a support carrying handle 24 all of which will be described in greater detail later on. The rear of the housing 15 includes a speaker 26, an earphone jack 28 and four screws 30, one in each corner, which are removed to replace the 9 V batteries (not shown). Extending outwardly from the front of the housing 15 is a three section telescoping pole 32 with locking nuts 34 for adjusting the extended length of the pole. Pole 32 supports a search head or probe 36.

As best shown in FIG. 2, the probe 36 of FIG. 1 contains five coils. The five coils include two pairs of attenuation coils 38 of opposing magnetic fields, one pair on each side of the probe head and a detection (inductive) coil 40 in the center of the probe and sandwiched between the coils 38 of each pair. One attenuation coil 38 of each pair overlaps a top portion of the detection coil on opposite sides and the other attenuation coil of each pair overlaps a bottom portion of the detection coil on opposite sides. Thus, the upper and lower attenuation coils of each pair are parallel to one another on the same axes and spaced apart by the thickness of the detection coil. The attenuation coils 38 overlap the detection coil 40 approximately 49% of their width and are approximately the same geometric shape as the detection coil to maintain linearity in their response to minerals and metal objects.

Moreover, each pair of attenuation coils 38 are electrically equivalent to a single coil 38' and coplanar to an equivalent target detection coil 40'. Electrically, the five coils are equivalent to the three coplanar coils 38' and 40' with the detection coil 40' in the center and one attenuation coil 38' on either side of the detection coil but on separate axes. This results in the ground being seen at three different points. One point by the target detection coil 40' and two adjacent points by the equivalent attenuation coils 38'. The five coils in the present invention are preferably all flat, elliptical shaped coils to maintain the same geometry for linearity purposes. If the target detection coil was round then each pair of attenuation coils which are electrically equivalent to one coil would also be round to maintain linearity. A particular configuration of the coils is not as important as that the geometry of the coils be the same. Since the attenuation and detection coils overlap, and are on different axis, attenuation characteristics are not perfect. If the attenuation and detection coils are on the same axis, the result would be perfect attenuation of not only the ground but of the coins in the ground too. The advantage of having the three separate axes is that the probe now attenuates the ground at two different points while detecting the coin at the other point. This way when the probe is attenuating the ground it is not attenuating a coin which will be detected by the target detection coil. The resulting diagrammatical patterns of having the probe see the ground at three different points includes an effective ground attenuation pattern 42 on either side of center of the probe 36 and a search head detection pattern 44 approximately in the center of the probe 36.

Now when treasure, such as a coin, passes from left to right through the effective attenuation and detection patterns 42 and 44, respectively, the following occurs. As the coin enters the first attenuation pattern the audio tone of the metal detector is pulled down to a zero level and remains at zero until the coin passes into the effective detection pattern. At that point, a sharp increase in audio tone is heard until the coin passes into the second attenuation pattern at which time the audio tone once again returns to a zero level. Trash, on the other hand, decreases audio tone to a zero level as it enters the first attenuation pattern and remains at a zero level until the end of the second attenuation pattern on a left to right direction of scan or vice versa.

FIG. 3 shows a partial schematic and block diagram of a preferred form of the novel circuitry which can be incorporated into the discriminating metal detector of U.S. Pat. No. 3,896,371, to compensate for a high mineral soil. The curcuit includes the electrically equivalent oscillator coils 38' on either side of the detection coil 40 and a variable attenuation capacitor 46 that is in parallel with the attenuation coils and precalibrated for discrimination and a detection capacitor 48 in parallel with the detection coil, both of which are located in the probe 36 along with the coils so that the capacitors are subject to the same environment as the attenuation and detection coils. The attenuation coils 38' are the counterpart of the oscillator coils in the oscillator circuit 46 of U.S. Pat. No. 3,896,371, in FIG. 6 thereof. However, that is where the similarities between the attenuation coils 38' and the oscillator coils of U.S. Pat. No. 3,896,371 end.

In accordance with the present invention, a reference (attenuation) oscillator 50 can be switched between a standard internal coil in the housing 15 like the above-mentioned patent or the external attenuation coils 38' in the search head 36 resonate at a high fixed frequency by means of the control switch 18 which can be rotated to a standard or attenuation position, respectively, as shown in FIG. 1. The attenuation and standard oscillator coils both operate, at approximately 700 kilohertz which is a substantially higher frequency than the detection coil 40. The oscillator (attenuation) coils 38' operating at a frequency of 700 kilohertz are at a frequency high enough where the frequency shift direction is the same for ferrous and non-ferrous which pass beneath the search head. However, at the lower discriminating frequency of approximately 44 kilohertz's for the detection coil, ferrous objects cause a frequency shift in the opposite direction from non-ferrous objects. Since each set of attenuation coils 38 reacts as a single coil 38' which is coplanar with the target detection coil 40 but on different axes on either side of the detection coil, the oscillation coils 38' having opposing fields operating at a high enough frequency that the oscillator coils do not magnetically induce or affect the detection coils' natural response to metal objects. The detection coil is placed in the magnetic null between the two attenuation coils 38' to minimize the falsing and transmission receive effects.

As shown in FIG. 3, the oscillation coils 38' in the probe 36 are connected to the attenuation oscillator 50. The output of oscillator 50 is fed into a frequency divider circuit 52 of any known conventional type. Frequency divider 52 scales down the 700 kilohertz output frequency of the attenuation oscillator 50 to approximately 44 kilohertz. The output of the frequency divider 52 is then fed into a search head driver circuit 54 of any known conventional type. The search head driver 54 in turn drives the detection coil at the 44 kilohertz frequency and isolates the oscillator 50 from the LC detection circuit to prevent feedback ffrom the detection circuit to oscillator 50.

As appreciated by those skilled in the art, with minor modifications to the circuit shown in FIG. 6, of U.S. Pat. No. 3,896,371, the metal detector of that patent could incorporate the ground compensating circuitry of FIG. 3 of the present invention. Other metal detectors of the type like U.S. Pat. No. 3,896,371 could also be modified to incorporate this novel circuitry of the present invention. For example, in the preferred embodiment an automatic tuner of any conventional type combines with the sensitivity control circuit operated by control knob 14 for setting the audio level detected by the level detection circuit. This automatic tuner further incorporates a normal time constant circuit and an anti-falsing time constant circuit (A.F.C.) with the latter circuit having a longer time constant. The reason for the longer time constant is because as the search head 36 passes over a piece of the junk, the signal (audio tone) is pulled down and if the tuner had a short time constant, the junk would pull the signal down real fast and then when the junk passed out from under the search head and the effective attenuation pattern, the signal would overshoot causing a tone on both sides of the scan which is called a false signal. So the operator has a choice of switching between a normal and A.F.C. time constant depending on whether the treasure hunt is being conducted in a low trash-low mineral area or high trash-high mineral area, respectively, by operating control knob 18 as shown in FIG. 1. So even though an automatic tuner is incorporated, the pushbutton 22 is required on different occasions in order for the circuitry to recover faster without the sensitivity setting 14 needing adjustment. By pushing the button 22 in, the time constant is shorter.

FIGS. 4a–4c show the detection Q curve of the coil and the oscillating frequency at which it is forced to resonate above its natural resonant frequency and the shift in the detection coil Q curve by the presence of a coin and ground minerals, respectively, when the control switch 18 is in the standard internal oscillator coil position. With control switch 18 in the standard position in either normal or A.F.C. time constant mode and with control switch 20 in the discriminate detection mode, the metal detector acts similar to the one in the above-mentioned patent. FIG. 4a shows a Q curve 56 of the detection coil in the search head of this patent when the probe is remote from a metal object. The natural resonant frequency of the detection coil 40 is represented by a line 58 and the oscillator frequency at which the coil is driven is represented by a line 60. A line 62 shows the audio detection level at which the level detection circuit by control switch 14 in FIG. 1 is set. The audio detection 62 is where line 60 intersects the detection coil Q curve 56. FIG. 4b shows what happens when a coin or other treasure passes beneath the search head and comes within the search head detection pattern of the detector which is larger than the pattern shown in FIG. 2 since the attenuation coils in the probe are inactive. Line 60 is the frequency of the detection coil and the natural resonant frequency 'A' corresponds to line 58 of FIG. 4a. When a coin comes within the search head detection pattern the resonant frequency of the LC including the detection coil 40 shifts to the right which is an increase in frequency and is represented by resonant frequency 'B' line 62b and dashed Q curve 64 of the natural resonant frequency of the LC circuit. The oscillator frequency at which the detection coil is driven is represented by line 60 and the audio signal increase is measured from the audio detection level line 62 to the point where line 60 crosses Q curve 64. This audio signal increase represents a coin being sensed. FIG. 4c dramatically illustrates how the natural resonant frequency of the detection LC circuit is shifted by high mineral soils. When the detection coil 40 of the LC circuit comes in magnetic contact with minerals in the ground the resonant frequency of the LC circuit shifts to the left represented by a resonant frequency 'C' line 66 and Q curve 68. This causes an audio signal decrease in the metal detector as the oscillator frequency line 60 crosses Q curve 68 below the audio detection line 62. In order to compensate for the change in the natural frequency of the LC circuit due to high minerals in the soil, the oscillator frequency 60 must also shift proportionally to the left.

FIG. 5 shows the circuitry of FIG. 3 incorporated into the modified circuitry of FIG. 6 in the '371 patent which simply incorporates the front end of the circuitry in FIG. 6 of the '371 patent being replaced by the circuitry shown in FIG. 3 of the present invention. The novel difference here is the oscillator coils 64 and 66 of the circuitry in FIG. 6 of the '371 patent are now incorporated into the probe head so that the oscillator coils as well as the detection coil see the same ground minerals and are affected in the same manner thereby. In short, the metal detector of the present invention detects between junk and treasure the same way as the circuitry in the '371 patent only the oscillator coils' frequency is higher than in the '371 patent, as well as the oscillator coils now being located in the probe head rather than magnetically isolated so that there is no magnetic interference as described in the '371 patent.

Operation

In operation, the metal detector 10 of the present invention functions similar to the one in U.S. Pat. No. 3,896,371, when control switch 18 is in the standard position in either normal or A.F.C. time constant mode and control switch 20 is in the discriminate detection mode. These above settings have no ground control for high mineral soils because the oscillator coils are internal but are effective in either low or high trash and low mineral soil areas.

Now when the treasure hunter goes into a high mineral soil area, he recalibrates the metal detector by turning the control switches on control panel 11. The operator turns control switch 18 to the attenuate position in the A.F.C. time constant mode and control switch 20 to the discriminate position in the detection mode. Next, the operator holds in pushbutton 22 and turns volume control switch 12 clockwise to its greatest volume position unless earphones are going to be plugged into earphone jack 28. The sensitivity control switch 14 is rotated clockwise until a perceptible audio tone is heard then the operator releases pushbutton 22 and the sound should maintain whatever level it was before the pushbutton 22 was released. If the sound dips substantially or is cracking then the operator should check the batteries by turning control switch 20 to battery positions B1 and B2 and checking their strength on meter scale 13 indicating battery charge. Following the above procedures, the operator now sets the trash rejection control switch 16. This control has readings from 0 to 10 for trash settings and operates similar to the trash rejection control in U.S. Pat. No. 3,896,371. For example, at a zero trash setting, the metal detector would pick up almost all ferrous and non-ferrous metal objects such as nails, tin foil, bottle caps, pull tabs, screw caps and coins. As the trash setting is adjusted higher, the metal detector would begin to reject nails around 2 or 3, foils around 5, ferrous bottle caps around 6 along with nickel, and non-ferrous pull tabs around eight. Therefore, as the search head scans the ground moving from left to right under the probe 36 in FIG. 2, the high mineral soil will have virtually no effect on the audio tone since the natural resonant frequency of the LC detection circuit and the oscillator frequency with its attenuation coils in the search head are both shifted proportionally by the ground minerals, but rejected trash will cause a decrease in audio tone as it passes beneath the effective attenuation and detection patterns 42 and 44, respectively, while a coin such as a penny will cause the audio tone to null in the attenuation patterns and to give a sharp increase in tone in the detection pattern. If a piece of trash, common to the search area, gives a sharp increase in the very center of the detection pattern then the operator simply raises the rejection setting gradually until it too nulls all the way across the scan.

In conclusion, the novel circuitry in the present invention overcomes the problems that transmission-receive (T.R.) metal detectors like U.S. Pat. No. 4,024,468, have encountered with high mineral soils. First, the present invention metal detector is different than a T.R. metal detector in that a metal object in the scan of the probe 36 causes no reaction between the attenuation coils and the detection coil. In fact, whether the control switch 18 is rotated to either the standard or attenuated position where the oscillator coils are internal or external in the probe, respectively, the metal detector performs the same as far as detection of treasure and trash. When the oscillator coils are external, they only serve to attenuate the ground minerals and shift the frequency of the oscillator proportionally to the shift in frequency of the detection circuit. Whereas, T.R. metal detectors need both the transmitting and receiving coils in the search head, otherwise, the T.R. metal detectors would have no detection, attenuation or audio signal. This serves to highlight another versatile feature of the invention in which the oscillator coils can be switched between an internal or external location depending upon the soil conditions, i.e., internal for low mineral soils and external for high mineral soils.

Preferably, the inductive and capacitive components of the oscillator and detection circuits have the following values:

- external attenuation coils = 18.2 microhenrys;
- internal oscillator coil = 14 to 28 microhenrys variable;
- detection coil = 1335 microhenrys;
- attenuation capacitance = 1620 picofarads in probe and 470 picofarads variable in housing internally;
- internal oscillator capacitance = 0.002 microfarads; and
- detection capacitance = 0.01 microfarads.

I claim:

1. A metal detector for discriminating between treasure and junk metal objects in a high mineral soil having a probe, a resonant circuit (with) including an inductive coil (in) within the probe, the improvement comprising:
   means connected to the resonant circuit for generating a signal to drive the resonant circuit at a predetermined frequency higher than the natural resonant frequency of the resonant circuit, said means further including at least two attenuating coils of opposing magnetic fields operating at a substantially higher frequency than said inductive coil and operating without magnetic effect on said inductive coil, said attenuating coils positioned adjacent the inductive coil in the probe so that the attenuating coils are exposed to the same soil conditions as the inductive coil which results in the attenuating coils shifting in frequency proportionally to the shift in frequency of the inductive coil to avoid effects of ground minerals, said attenuating coils operating at a high enough frequency as to have a rise in frequency for ferrous and non-ferrous metal objects and a decrease in frequency for minerals; (and)
   a frequency divider connected in series between the generating means and resonant circuit for lowering the higher frequency of the generating means to the lower predetermined frequency of the drive signal required to discriminate between treasure and junk metal objects(.);
   said resonating circuit being driven by the drive signal to provide several different types of output signals, a first output signal when the probe is proximate mineral soil, a second output signal when the probe is proximate junk objects and a third output signal when the probe is proximate treasure objects; and
   means responsive to said third output signal for indicating that the probe is sensing treasure in the mineral soil area.

2. The metal detector of claim 1 wherein:
   said frequency divider in series with the resonant circuit isolates the generating means from the resonant circuit to prevent feedback from the resonant circuit to the generating means so that the frequency of the driving signal remains substantially constant.

3. The metal detector of claim 1 wherein:
   the generating means is producing a drive signal of approximately 700 kilohertz.

4. The metal detector of claim 1 wherein:
   the drive signal produced by the generating means is scaled down by the frequency divider to a signal of approximately 44 kilohertz for driving the resonant circuit.

5. The metal detector of claim 1 wherein:
   the inductive coil is a flat, oval shaped coil with its individual turns in the same plane, and the attenuating coils comprise two pair of essentially flat, oval shaped coils with the individual turns of each coil in the same plane and the coils of each pair parallel spaced-apart on the same axis approximately the thickness of the inductive coil, said pairs of coils positioned to overlap opposing sides of the inductive coil with the inductive coil sandwiched between the coils of each pair.

6. The metal detector of claim 5 wherein:
   the two pair of attenuating coils are electrically equivalent to two coils on opposite sides of the inductive coil and on approximately the same plane as the inductive coil.

7. The metal detector of claim 1 wherein:
   the attenuating coils and the inductive coil in the probe overlap and have approximately the same geometric shape to maintain linearity in the response to minerals and metal objects.

8. The metal detector of claim 1 wherein:
   the attenuating coils operate at a frequency of 700 kilohertz and the inductive coil operates at 44 kilohertz.

9. A metal detector comprising:
   a probe;

a resonant circuit having an induction coil (positioned in) contained within the probe;

an oscillator having at least two attenuating coils of opposing magnetic fields positioned adjacent the inductive coil in the probe and having an output signal of approximately 700 kilohertz, said oscillator frequency being high enough as to produce a rise in oscillator frequency for ferrous and non-ferrous metal objects and to produce a decrease in oscillator frequency for minerals (; and) which shift in frequency proportionally parallels the response of the resonant circuit to the same conditions;

a frequency divider connected to the output of said oscillator for scaling down the frequency of the oscillator to approximately 44 kilohertz, said divider having its output signal of 44 kilohertz connected to the resonant circuit for driving the resonant circuit above its natural resonance so that the inductive coil has a rise in frequency for valuable metal objects and a decrease in frequency for junk metal objects(.);

said resonating circuit being driven by said drive signal to provide at least one output signal when the probe is proximate valuable metal objects in a high mineral soil; and means responsive to said output signal for generating an indication representing that the probe is proximate to said valuable metal objects.

10. The metal detector of claim 9 wherein:

the inductive coil is sandwiched between the two attenuating coils, each attenuating coil comprises a pair of coils parallelly spaced-apart from one another by approximately the thickness of the inductive coil on the same axis, each pair of coils overlapping an opposing portion of the inductive coil and having a similar geometric shape as the inductive coil to maintain linearity.

* * * * *